(12) United States Patent
Bastioli et al.

(10) Patent No.: US 8,193,299 B2
(45) Date of Patent: *Jun. 5, 2012

(54) BIODEGRADABLE ALIPHATIC-AROMATIC COPOLYESTER

(75) Inventors: Catia Bastioli, Novara (IT); Tiziana Milizia, Novara (IT); Giovanni Floridi, Novara (IT); Andrea Scaffidi Lallaro, Omegna (IT); Giandomenico Cella, Novara (IT); Maurizio Tosin, Serravalle Sesia (IT)

(73) Assignee: Novamont S.p.A., Novara (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/909,032

(22) PCT Filed: Mar. 17, 2006

(86) PCT No.: PCT/EP2006/002673
§ 371 (c)(1),
(2), (4) Date: Sep. 18, 2008

(87) PCT Pub. No.: WO2006/097355
PCT Pub. Date: Sep. 21, 2006

(65) Prior Publication Data
US 2009/0005472 A1    Jan. 1, 2009

(30) Foreign Application Priority Data
Mar. 18, 2005 (IT) .............................. MI2005A0452

(51) Int. Cl.
*C08G 63/16* (2006.01)

(52) U.S. Cl. ........ 528/302; 528/271; 528/272; 528/304; 525/35; 525/418; 525/419; 525/437; 428/35.1; 428/77; 428/480

(58) Field of Classification Search .................. 528/271, 528/272, 300, 302, 303, 304, 305, 306, 308, 528/308.1, 308.3, 371, 437; 428/35.1, 35.2, 428/35.7, 36.4, 77, 221, 357, 409, 411.1, 428/480; 525/27, 35, 47, 418, 419, 437
See application file for complete search history.

(56) References Cited

U.S. PATENT DOCUMENTS

| 3,515,626 | A | | 6/1970 | Jackson, Jr. et al. |
| 4,131,595 | A | | 12/1978 | Breitenfellner et al. |
| 4,966,959 | A | | 10/1990 | Cox et al. |
| 5,661,193 | A | | 8/1997 | Khemani et al. |
| 6,020,393 | A | * | 2/2000 | Khemani ....................... 521/182 |
| 6,150,490 | A | * | 11/2000 | Deckwer et al. ................. 528/80 |
| 6,399,716 | B2 | * | 6/2002 | Chung et al. .................. 525/444 |
| 2002/0115817 | A1 | * | 8/2002 | Hayes ........................ 528/295.3 |

FOREIGN PATENT DOCUMENTS

| DE | 195 08 737 | 9/1996 |
| EP | 0 950 678 | 10/1999 |
| GB | 1033958 | 6/1965 |
| WO | WO 2006/097354 A1 | 9/2006 |

OTHER PUBLICATIONS

European Patent Office Communication of a Notice of Opposition dated Jan. 10, 2011, in European Patent No. 1858951 and Opposition (Annex 1) and Document 06.
Mettler Toledo, Operating instructions, "Density determination kit for Excellence XP/XS analytical balances," 2008, pp. 1-15, 72.
Chuah, H.H., et al., "Poly(trimethylene terephthalate) molecular weight and Mark-Houwink equation," Polymer, vol. 42, 2001, pp. 7137-7139.
Gargallo, Ligia, et al., "Conformational transition in (maleic anhydride mono-*n*-octyl Ilaconate) copolymer," Polymer Bulletin, vol. 37, 1996, pp. 553-555.
Odian, George, "Step Polymerization," Principles of Polymerization, John Wiley and Sons, Fourth Edition, 2004, pp. 39-197.
Acknowledgement of Receipt and Reply under Rule 79(1) EPC dated Aug. 4, 2011, and Experimental Report.

* cited by examiner

*Primary Examiner* — James J Seidleck
*Assistant Examiner* — Frances Tischler
(74) *Attorney, Agent, or Firm* — Connolly Bove Lodge & Hutz LLP

(57) ABSTRACT

Biodegradable aliphatic/aromatic copolyester comprising: A) an acid component comprising repeating units of: 1) 53 to 54 mol % of an aromatic carboxylic acid; 2) 47 to 36 mol % of an aliphatic acid at least 50% of which is azelaic acid; B) a diol component selected from the group consisting of $C_3$, $C_4$ and $C_6$ diols; said AAPE being disintegrated according to the Standard ISO 20200 in 90 days.

7 Claims, No Drawings

BIODEGRADABLE ALIPHATIC-AROMATIC COPOLYESTER

RELATED APPLICATIONS

This application is a national stage application (under 35 U.S.C. §371) of PCT/EP2006/002673 filed Mar. 17, 2006, which claims benefit of Italian application MI2005A000452 filed Mar. 18, 2005, disclosure of which are incorporated herein by reference.

The present invention relates to a biodegradable aliphatic-aromatic (AAPE) polyester obtained from an aliphatic acid at least 50% of which is azelaic acid, at least a polyfunctional aromatic acids and at least a dialcohol, as well as to mixtures of said polyesters with other biodegradable polymers both of natural origin and of synthetic origin.

Biodegradable aliphatic-aromatic polyesters obtained from dicarboxylic acids and dialcohols are known in the literature and are commercially available. The presence of the aromatic component in the polyester chain is important to obtain polymers with sufficiently high melting points and with adequate crystallization rates.

Although polyesters of this sort are currently commercially available, the amount of aromatic acid in the chain is typically lower than 49% since the above said threshold, the percentage of biodegradation of the polyesters decreases significantly above said threshold.

It is reported in the literature (Muller et al., Angew. Chem., Int., Ed. (1999), 38, pp. 1438-1441) that copolymers of the polybutylene adipate-co-terephthalate type with a molar fraction of terephthalate of 42 mol %, biodegrade completely to form compost in twelve weeks, whereas products with 51 mol % of molar fraction of terephthalate show a percentage of biodegradation of less than 40%. This different behaviour was attributed to the formation of a higher number of butylene terephthalate sequences with a length greater than or equal to 3, which are less easily biodegradable. If it were possible to maintain suitable biodegradation properties, an increase in the percentage of aromatic acid in the chain would, however, be desirable in so far as it would enable an increase in the melting point of the polyester, an increase in, or at least a maintenance of, important mechanical properties, such as ultimate strength and elastic modulus, and would moreover enable an increase in the crystallization rate of the polyester, thereby improving its industrial processability.

A further drawback of biodegradable aliphatic-aromatic polyesters that are currently commercially available is represented by the fact that the monomers of which they are constituted come from non-renewable sources, thereby maintaining a significant environmental impact associated to the production of such polyesters despite their biodegradability. They have far more energy content than LDPE and HDPE particularly in the presence of adipic acid. On the other hand, the use of monomers of vegetal origin would contribute to the reduction of emission of $CO_2$ in the atmosphere and to the reduction in the use of monomers derived from non-renewable resources.

U.S. Pat. No. 4,966,959 discloses certain copolyesters comprising from 60 to 75% mol of terephtalic acid, 25 to 40% mol of a carboxylic aliphatic or cycloaliphatic acid, and a glycol component. The inherent viscosity of such polyesters is from about 0.4 to about 0.6, rendering the polyesters useful as adhesives but unsuitable for many other applications.

U.S. Pat. No. 4,398,022 discloses copolyesters comprising terephtalic acid and 1,12-dodecanedioic acid and a glycol component comprising 1,4-cyclohexanedimethanol. The acid component may optionally include one or more acids conventionally used in the production of polyesters, but the examples show that 1,12-dodecanedioic acid must be present for the polyesters to have the desired melt strength.

U.S. Pat. No. 5,559,171 discloses binary blends of cellulose esters and aliphatic-aromatic copolyesters. The AAPE component of such blends comprises a moiety derived from a $C_2$-$C_{14}$ aliphatic diacid which can range from 30 to 95% mol in the copolymer, a moiety derived from an aromatic acid which can range from 70 to 5% mol in the copolymer. Certain AAPEs disclosed in this document do not require blending and are useful in film application. They comprise a moiety derived from a $C_2$-$C_{10}$ aliphatic diacid which can range from 95 to 35% mol in the copolymer, and a moiety derived from an aromatic acid which can range from 5 to 65% mol in the copolymer.

DE-A-195 08 737 discloses biodegradable AAPEs comprising terephtalic acid, an aliphatic diacid and a diol component. The weight average molecular weight $M_w$ of such AAPEs is always very low (maximum 51000 g/mol), so that their industrial applicability is limited.

It is therefore the overall object of the present invention to disclose an improved AAPE and blends containing the same.

In fact, the present invention regards a biodegradable aliphatic/aromatic copolyester (AAPE) comprising:
A) an acid component comprising repeating units of:
  1) 53 to 64 mol %, preferably 54 to 60 mol, of an aromatic carboxylic acid;
  2) 47 to 36%, preferably 46 to 40, of an aliphatic acid at least 50% of which is azelaic acid;
B) a diol component selected from the group selected from the group consisting of $C_3$, $C_4$ and $C_6$ diol;
said AAPE being disintegrated according to the Standard ISO 20200 in 90 days, and having:
  a density of less than 1.22 g/cc
  a number average molecular weight $M_n$ of 40,000-140,000
  an inherent viscosity of 0.8-1.5
  a Elastic Modulus higher than 100 MPa.

By "polyfunctional aromatic acids" for the purposes of the present invention are meant aromatic dicarboxylic compounds of the phthalic-acid type and their esters, preferably terephthalic acid.

The content of aromatic dicarboxylic acid in the biodegradable polyesters according to the claims of the present invention is preferably between 54 mol % and 60 mol % with respect to the total molar content of the dicarboxylic acids.

The molecular weight $M_n$ of the polyester according to the present invention is between 40,000 and 140,000. The polydispersity index $M_w/M_n$ determined by means of gel-permeation chromatography (GPC) is between 1.7 and 2.6, preferably between 1.8 and 2.5.

The polyester according to the invention is rapidly crystallisable and has a crystallization temperature $T_c$ higher than 40° C.

Examples of diols according to the present invention are 1,2-propandiol, 1,3-propandiol, 1,4-butandiol, 1,6-hexandiol. Butandiol is the most preferred diol.

The polyesters according to the invention have an inherent viscosity (measured with Ubbelhode viscosimeter for solutions in $CHCl_3$ of a concentration of 0.2 g/dl at 25° C.) of between 0.8 dl/g and 1.5 dl/g, preferably between 0.83 dl/g and 1.3 dl/g and even more preferably between 0.85 dl/g and 1.2 dl/g.

The Melt Flow Rate (MFR) of the polyesters according to the invention, in the case of use for applications typical of plastic materials (such as, for example, bubble filming, injection moulding, foams, etc.), is between 0.5 and 100 g/10 min, preferably between 1.5-70 g/10 min, more preferably between 2.0 and 50 g/10 min (measurement made at 190° C./2.16 kg according to the ASTM D1238 standard).

The polyesters have a density measured with a Mohr-Westphal weighing machine of less than 1.25 g/cm$^3$, preferably less than 1.22 g/cm$^3$ and even more preferably less than 1.20 g/cm$^3$.

Surprisingly the polyesters according to the present invention show a Elmendorf tear strength (determined according to the standard ASTM D1922-89 and measured on blown film filmed with a blowing ratio of 2-3 and a draw down ratio of 7-14) higher than 70 N/mm, preferably higher than 80 N/mm, for the quantity (cross direction+longitudinal direction)/2. The ratio between the values longitudinal direction/cross direction (anisotropic index) is also surprisingly good being comprised in the range of 0.5-2.0.

The aliphatic acid A2 which can be different from azelaic acid can comprise or consist of at least one hydroxy acid or one dicarboxylic acid different from azelaic acid, in an amount of up to 50% mol, preferably 30 mol %, with respect to the total molar content of azelaic acid. Examples of convenient hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactide. The hydroxy acids can be inserted in the chain as such, or else can also be previously made to react with diacids or dialcohols.

In the process of preparation of the copolyester according to the invention one or more polyfunctional molecules, in amounts of between 0.02-3.0 mol % preferably between 0.1 mol % and 2.5 with respect to the amount of dicarboxylic acids (as well as to the possible hydroxy acids), can advantageously be added in order to obtain branched products. Examples of these molecules are glycerol, pentaerythritol, trimethylol propane, citric acid, dipentaerythritol, monoanhydrosorbitol, monohydromannitol, epoxidized oils such as epoxidized soybean oil, epoxidized linseed oil and so on, dihydroxystearic acid, itaconic acid and so on.

Although the polymers according to the present invention reach high levels of performance without any need to add chain extenders such as di and/or polyisocyanates and isocyanurates, di and/or poly epoxides, bis-oxazolines or poly carbodiimides or divinylethers it is in any case possible to modify the properties thereof as the case may require.

Generally such additives are used in percentages comprised between 0.05-2.5%, preferably 0.1-2.0%. In order to improve the reactivity of such additives, specific catalysts can be used such as for example zinc stearates (metal salts of fatty acids) for poly epoxides.

The increase in the molecular weight of the polyesters can advantageously be obtained, for example, by addition of various organic peroxides during the process of extrusion. The increase in molecular weight of the biodegradable polyesters can be easily detected by observing the increase in the values of viscosity following upon treatment of the polyesters with peroxides.

In case of use of the polyester according to the present invention for the production of films, the addition of the above mentioned chain extenders according to the teaching of EP 1 497 370 results in a production of a gel fraction lower than 4.5% w/w with respect to the polyester. In this connection the content of EP 1 497 370 has to be intended as incorporated by reference in the present description. The polyesters according to the invention present properties and values of viscosity that render them suitable for use, by appropriately modulating the relative molecular weight, in numerous practical applications, such as films, injection-moulded products, extrusion-coating products, fibres, foams, thermoformed products, extruded profiles and sheets, extrusion blow molding, injection blow molding, rotomolding, stretch blow molding etc.

In case of films, production technologies like film blowing, casting, coextrusion can be used. Moreover such films can be subject to biorientation in line or after film production. The films can be also oriented through stretching in one direction with a stretching ratio from 1:2 up to 1:15, more preferably from 1:2.2 up to 1:8. It is also possible that the stretching is obtained in presence of an highly filled material with inorganic fillers. In such a case, the stretching can generate microholes and the so obtained film can be particularly suitable for hygiene applications.

In particular, the polyesters according to the invention are suitable for the production of:
films, whether one-directional or two-directional, and multilayer films with other polymeric materials;
films for use in the agricultural sector as mulching films;
cling films (extensible films) for foodstuffs, for bales in the agricultural sector and for wrapping of refuse;
shrink film such as for example for pallets, mineral water, six pack rings, and so on; bags and liners for collection of organic matter, such as collection of refuse from foodstuffs, and for gathering mowed grass and yard waste;
thermoformed single-layer and multilayer packaging for foodstuffs, such as for example containers for milk, yoghurt, meat, beverages, etc.;
coatings obtained with the extrusion-coating technique;
multilayer laminates with layers of paper, plastic materials, aluminium, metallized films;
foamed or foamable beads for the production of pieces formed by sintering;
foamed and semi-foamed products including foamed blocks made up of pre-foamed particles;
foamed sheets, thermoformed foamed sheets, containers obtained therefrom for the packaging of foodstuffs;
containers in general for fruit and vegetables;
composites with gelatinized, destructured and/or complexed starch, natural starch, flours, other fillers of natural, vegetal or inorganic origin;
fibres, microfibres, composite fibres with a core constituted by rigid polymers, such as PLA, PET, PTT, etc. and an external shell made with the material according to the invention, dablens composite fibres, fibres with various sections (from round to multilobed), flaked fibres, fabrics and non-woven fabrics or spun-bonded or thermo-bonded fabrics for the sanitary sector, the hygiene sector, the agricultural sector, georemediation, landscaping and the clothing sector.

The polyesters according to the invention can moreover be used in blends, obtained also by reactive extrusion, whether with polyesters of the same type (such as aliphatic/aromatic copolyester as for example polybutylen tereptalate adipate PBTA, polybutylen tereftalatesuccinate PBTS and polybutylen tereftalateglutarate PBTG) or with other biodegradable polyesters (for example, polylactic acid, poly-ϵ-caprolactone, polyhydroxybutyrates, such as poly-3-hydroxybutyrates, poly-4-hydroxybutyrates and polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, and polyalkylene succinates and their copolymers with adipic acid, lactic acid or lactide and caprolacton and their combinations), or other polymers different from polyesters.

Mixtures of polyesters with polylactic acid are particularly preferred.

The polyesters according to the invention can also be used in blends with polymers of natural origin, such as for example starch, cellulose, chitosan, alginates, natural rubbers or natural fibers (such as for example jute, kenaf, hemp). The starches and celluloses can be modified, and amongst these starch or cellulose esters with a degree of substitution of between 0.2 and 2.5, hydroxypropylated starches, and modified starches with fatty chains may, for example, be mentioned. Preferred esters are acetates, propionates, butirrates and their combinations. Starch can moreover be used both in its destructured form and in its gelatinized form or as filler.

Mixtures of the AAPE according to the invention with starch are particularly preferred.

Mixtures of the AAPE according to the present invention with starch can form biodegradable polymeric compositions with good resistance to ageing and to humidity. In these compositions, which comprise thermoplastic starch and a thermoplastic polymer incompatible with starch, starch constitutes the dispersed phase and the AAPE thermoplastic polymer constitutes the continuous phase.

The polymeric compositions can maintain a high tear strength even in conditions of low humidity. Such characteristic is obtained when starch is in the form of a dispersed phase with an average dimension lower than 1 μm. The preferred average numeral size of the starch particles is between 0.1 and 0.5 microns and more than 80% of the particles have a size of less than 1 micron.

Such characteristics can be achieved when the water content of the composition during mixing of the components is preferably kept between 1 and 15%. It is, however, also possible to operate with a content of less than 1% by weight, in this case, starting with predried and pre-plasticized starch.

It could be useful also to degrade starch at a low molecular weight before or during compounding with the polyesters of the present invention in order to have in the final material or finished product a starch inherent viscosity between 1 and 0.2 dl/g, preferably between 0.6 and 0.25 dl/g, more preferably between 0.55 and 0.3 dl/g.

Destructurized starch can be obtained before of during mixing with the AAPE of the present invention in presence of plasticizers such as water, glycerol, di and polyglycerols, ethylene or propylene glycol, ethylene and propylene diglycol, polyethylene glycol, polypropylenglycol, 1,2 propandiol, trymethylol ethane, trimethylol propane, pentaerytritol, dipentaerytritol, sorbitol, erytritol, xylitol, mannitol, sucrose, 1,3 propandiol, 1,2, 1,3, 1,4 buthandiol, 1,5 pentandiol, 1,6, 1,5 hexandiol, 1,2,6, 1,3,5-hexantriol, neopenthil glycol, and polyvinyl alcohol prepolymers and polymers, polyols acetates, ethoxylates and propoxylates, particularly sorbitol ethoxylate, sorbitol acetate, and pentaerytritol acetate. The quantity of high boiling point plasticizers (plasticizers different from water) used are generally from 0 to 50%, preferably from 10 to 30% by weight, relative to starch.

Water can be used as a plasticizer in combination with high boiling point plasticizers or alone during the plastification phase of starch before or during the mixing of the composition and can be removed at the needed level by degassing in one or more steps during extrusion. Upon completion of the plastification and mixing of the components, the water is removed by degassing to give a final content of about 0.2-3% by weight.

Water as well as high-boiling point plasticizers modify the viscosity of the starch phase and affect the Theological properties of the starch/polymer system, helping to determine the dimensions of the dispersed particles. Compatibilizers can be also added to the mixture. They can belong to the following classes:

Additives such as esters which have hydrophilic/lipophilic balance index values (HLB) greater than 8 and which are obtained from polyols and from mono or polycarboxylic acids with dissociation constants pK lower than 4.5 (the value relates to pK of the first carboxyl group in the case of polycarboxylic acids.)

Esters with HLB values of between 5.5 and 8, obtained from polyols and from mono or polycarboxylic acids with less than 12 carbon atoms and with pK values greater than 4.5 (this value relates to the pK of the first carboxylic group in the case of polycarboxylic acids).

Esters with HLB values lower than 5.5 obtained from polyols and from fatty acids with 12-22 carbon atoms.

They can be used in quantities of from 0.2 to 40% weight and preferably from 1 to 20% by weight related to the starch.

The starch blends can also contain polymeric compatibilizing agents having two components: one compatible or soluble with starch and a second one soluble or compatible with the polyester.

Examples are starch/polyester copolymers through transesterification catalysts. Such polymers can be generated trough reactive blending during compounding or can be produced in a separate process and then added during extrusion. In general block copolymers of hydrophilic and hydrophobic units are particularly suitable.

Additives such as di and polyepoxides, di and poly isocyanates, isocyanurates, polycarbodiimides and peroxides can also be added. They can work as stabilizers as well as chain extenders.

All the products above can help to create the needed microstructure. It is also possible to promote in situ reactions to create bonds between starch and the polymeric matrix. Also aliphatic-aromatic polymers chain extended with aliphatic or aromatic diisocyanates or di and polyepoxides or isocianurates or with oxazolines with intrinsic viscosities higher than 1 dl/g or in any case aliphatic-aromatic polyesters with a ratio between Mn and MFI at 190° C., 2.16 kg higher than 10,000, preferably higher than 12, 500 and more preferably higher than 15,000 can also be used to achieve the needed microstructure.

Another method to improve the microstructure is to achieve starch complexation in the starch-polyester mixture.

In such a case, in the X-Ray spectra of the compositions with the polyester according to the present invention, the Hc/Ha ratio between the height of the peak (Hc) in the range of 13-14° of the complex and the height of the peak (Ha) of the amorphous starch which appears at about 20° (the profile of the peak in the amorphous phase having been reconstructed) is less than 2 and greater than 0.02.

The starch polyester ratio is comprised in the range 5/95% weight up to 60/40% by weight, more preferably 10/90-45/55% by weight.

In such starch-based blends in combination with the polyesters of the present invention it is possible to add polyolefines, polyvynil alcohol at high and low hydrolysis degree, ethylene vinylalcohol and ethylene vinylacetate copolymers and their combinations as well as aliphatic polyesters such as polybuthylensuccinate, polybuthylensuccinate adipate, polybuthylensuccinate adipate-caprolactate, polybuthylensuccinate-lactate, polycaprolactone polymers and copolymers, PBT, PET, PTT, polyamides, polybuthylen terephtalate adipates with a content of terephtalic acid between 40 and 70% with and without solfonated groups with or without branchs and possibly chain extended with diisocianates or isocianurates, polyurethanes, polyamide-urethanes, cellulose and starch esters such as acetate, propionate and butyrate with substitution degrees between 1 and 3 and preferably between 1.5 and 2.5, polyhydroxyalkanoates, poly Llactic acid, polyD lactic acid and lactides, their mixtures and copolymers.

The starch blends of the polyesters of the present invention maintain a better ability to crystallize in comparison with compostable starch blends where copolyester are poly buthylen adipate tereftalates at tereftalic content between 45 and 49% (range of the product with industrial performances) and can be easily processable in film blowing even at MFI (170° C., 5 kg) of 7 g/10 min due to the high crystallization rate of the matrix. Moreover they have impact strength higher than 20 kj/m2, preferably higher than 30 kj/m2 and most preferably higher than 45 kj/m2 (measured on blown film 30 um thick at 10° C. and less then 5% relative humidity).

Particularly resistant and easily processable compounds contain destructurized starch in combination with the polyesters of the invention and polylactic acid polymers and copolymers with and without additives such as polyepoxydes, carbodiimmides and/or peroxides.

The starch-base films can be even transparent in case of nanoparticles of starch with dimensions lower than 500 μm and preferably lower than 300 μm.

It is also possible to go from a dispersion of starch in form of droplets to a dispersion in which two co-continuous phases coexist and the blend is characterized for allowing a higher water content during processing.

In general, to obtain co-continuous structures it is possible to work either on the selection of starch with high amylopectine content and/or to add to the starch-polyester compositions block copolymers with hydrophobic and hydrophilic units. Possible examples are polyvynilacetate/polyvinylalcohol and polyester/polyether copolymers in which the block length, the balance between the hydrophilicity and hydrophobicity of the blocks and the quality of compatibilizer used can be suitably changed in order to finely adjust the microstructure of the starch-polyester compositions.

The polyesters according to the invention can also be used in blends with the polymers of synthetic origin and polymers of natural origin mentioned above. Mixtures of polyesters with starch and polylactic acid are particularly preferred.

Blends of the AAPE according the present invention with PLA are of particular interest because the high crystallization rate of the aliphatic-aromatic polyester of the invention and its high compatibility with PLA polymers and copolymers permits to cover materials with a wide range of rigidities and high speed of crystallization which makes these blends particularly suitable for injection molding and extrusion.

Moreover, blends of such polyester with poly L lactic acid and poly D lactic acid or poly L lactide and D lactide where the ratio between poly L and poly D lactic acid or lactide is in the range 10/90-90/10 and preferably 20/80-80/20 and the ratio between aliphatic-aromatic polyester and the polylactic acid or PLA blend is in the range 5-95-95/5 and preferably 10/90-90/10 are of particular interest for the high crystallization speed and the high thermal resistance. Polylactic acid or lactide polymers or copolymers are generally of molecular weight Mn in the range between 30,000 and 300,000, and more preferably between 50,000 and 250,000.

To improve the transparency and thoughness of such blends and decrease or avoid a lamellar structure of polylactide polymers it could be possible to introduce other polymers as compatibilizers or toughening agents such as polybuthylen succinate and copolymers with adipic acid and or lactic acid and or hydroxyl caproic acid, or polycaprolactone or aliphatic polymers of diols from C2 to C13 and diacids from C4 to C13 or polyhydroxyalkanoates or polyvynilalcohol in the range of hydrolysis degree between 75 and 99% and its copolymers or polyvynilacetate in a range of hydrolysis degree between 0 and 70%, preferably between 0 and 60%. Particularly preferred as diols are ethylene glycol, propandiol, butandiol and as acids: azelaic, sebacic, undecandioic acid, dodecandioic acid and brassilic acid and their combinations.

To maximize compatibility among the AAPE of the invention and poly lactic acid it is very useful the introduction of copolymers with blocks having high affinity for the aliphatic-aromatic copolyester of the invention and blocks with affinity for the poly lactic acid polymers or copolymers. Particularly preferred examples are block copolymers of the aliphatic aromatic copolymer of the invention with polylactic acid. Such block copolymers can be obtained taking the two original polymers terminated with hydroxyl groups and then reacting such polymers with chain extenders able to react with hydroxyl groups such as diisocianates. Examples are 1,6 esamethylendiisocianate, isophorondiisocyanate, methylendiphenildiisocyanate, toluendiisocianate or the like. It is also possible to use chain extenders able to react with acid groups like di and poly epoxides (e.g. bisphenols diglycidyl ethers, glycerol diglycidyl ethers), divinyl derivatives if the polymers of the blend are terminated with acid groups.

It is possible also to use as chain extenders carbodiimmides, bis-oxazolines, isocianurates etc.

The intrinsic viscosity of such block copolymers can be between 0.3 and 1.5 dl/g, more preferred are between 0.45 and 1.2 dl/g. The amount of compatibilizer in the blend of aliphatic aromatic copolyesters and polylactic acid can be in the range between 0.5 and 50%, more preferably between 1 and 30%, more preferably between 2 and 20% by weight.

The AAPE according to the present invention can advantageously be blended also with filler both of organic and inorganic nature preferably. The preferred amount of fillers is in the range of 0.5-70% by weight, preferably 5-50% by weight.

As regards organic fillers wood powder, proteins, cellulose powder, grape residue, bran, maize husks, compost, other natural fibres, cereal grits with and without plasticizers such as polyols can be mentioned.

As regards inorganic fillers, it can be mentioned substances able to be dispersed and/or to be reduced in lamellas with submicronic dimensions, preferably less than 500 nm, more preferably less than 300 nm, and even more preferably less than 50 nm. Particularly preferred are zeolites and silicates of various kind such as wollastonites, montmorillonites, hydrotalcites also functionalised with molecules able to interact with starch and or the specific polyester. The use of such fillers can improve stiffness, water and gas permeability, dimensional stability and maintain transparency.

The process of production of the polyesters according to the present invention can be carried out according to any of the processes known to the state of the art. In particular the polyesters can be advantageously obtained with a polycondensation reaction.

Advantageously, the process of polymerization of the copolyester can be conducted in the presence of a suitable catalyst. As suitable catalysts, there may be cited, by way of example, metallo-organic compounds of tin, for example derivatives of stannoic acid, titanium compounds, for example orthobutyl titanate, and aluminium compounds, for example triisopropyl aluminium, antimony compounds, and zinc compounds.

EXAMPLES

In the examples provided hereinafter,
MFR was measured in the conditions envisaged by the ASTM D1238-89 standard at 150° C. and 5 kg or at 190° C. and 2.16 kg;
the melting and crystallization temperatures and enthalpies were measured with a differential scanning calorimeter Perkin Elmer DSC7, operating with the following thermo profile:
1st scan from −30° C. to 200° C. at 20° C./min
2nd scan from 200° C. to −30° C. at 10° C./min
3rd scan from −30° C. to 200° C. at 20° C./min
$T_{m1}$ was measured as endothermic-peak value of the 1st scan, and $T_{m2}$ as that of the 3rd scan; $T_c$ was measured as exothermic-peak value of the 2nd scan.

Density
Determination of Density according to the Mohr Westphal method has been performed with an analytical balance Sartorius AC 120S equipped with a Sartorius Kit YDK 01. The Kit is provided with two small baskets. Once the Kit has been mounted, ethanol has been introduced in the crystallizer. The balance has been maintained at room temperature.

Each test has been performed with about 2 g of polymer (one or more pellets).

The density d has been determined according to the above formula:

$$D=(W_a/G)d_{fl}$$

$W_a$: weight of the sample in air
$W_{fl}$: weight of the sample in alcohol $$G=W_a-W_{fl}$$

$d_{fl}$=ethanol density at room temperature (Values read on tables provided by the company Sartorius with the Kit). The experimental error of the Density values is in the range of ±2.5×10⁻³.

$\eta_{in}$ has been determined according to the ASTM 2857-87 standard.

$M_n$ has been determined on a Agilent 1100 Series GPC system with chloroform as eluent and polystyrene standards for the calibration curve.

Example 1

A 25-1 steel reactor, provided with a mechanical stirrer, an inlet for the nitrogen flow, a condenser, and a connection to a vacuum pump was charged with:
3187.4 g of dimethyl terephthalate (16.43 mol),
3559.1 g of butandiol (39.55 mol),
2630.1 g of azelaic acid (14.00 mol),
7.0 g mono butylstannoic acid
The molar percentage of aromatic content with respect to the sum of the acids was 54 mol %.

The temperature of the reactor was then increased up to 200° C. After approximately 90% of the theoretical amount of water and methanol had been distilled, the pressure was gradually reduced to a value of less than 3 mmHg, and the temperature was raised to 240° C.

After approximately 4 hours, a product was obtained with inherent viscosity (measured in chloroform at 25° C., c=0.2 g/dl) $\eta_{in}$1.04 (dl/g), density 1.20 g/cc, $M_n$=52890 and MFR (190° C.; 2.16 kg)=7.1 g/10 min.

Example 2

The process of Example 1 was repeated with:
3561.8 g of dimethyl terephthalate (18.36 mol),
3580.2 g of butandiol (39.78 mol),
2301.1 g of azelaic acid (12.24 mol)
7.0 g mono butylstannoic acid
The molar percentage of aromatic content with respect to the sum of the acids was 60 mol %.

After approximately 4 hours, a product was obtained with inherent viscosity (measured in chloroform at 25° C., c=0.2 g/dl) $\eta_{in}$=0.95 (dl/g), density 1.21 g/cc, $M_n$=50300 and MFR (190° C.; 2.16 kg)=8.0 g/10 min.

Example 3

Comparison

The process of Example 1 was repeated with
2939 g of dimethyl terephthalate (15.15 mol),
3545.1 g of butandiol (39.39 mol),
2848.2 g of azelaic acid (15.15 mol)
7.0 g mono butylstannoic acid
The molar percentage of aromatic content with respect to the sum of the acids was 50 mol %.

After approximately 4 hours, a product was obtained with inherent viscosity (measured in chloroform at 25° C., c=0.2 g/dl) $\eta_{in}$=1.0 (dl/g), density 1.18 g/cc and MFR (190° C.; 2.16 kg)=7.9 g/10 min.

Example 4

3177.3 g of dimethyl terephthalate (16.38 mol),
3547.4 g of butandiol (39.41 mol),
2359.9 g of azelaic acid (12.55 mol)
281.6 g of sebacic acid (1.39 mol)
7.0 g mono butylstannoic acid
The molar percentage of aromatic content with respect to the sum of the acids was 54 mol %.

After approximately 4 hours, a product was obtained with inherent viscosity (measured in chloroform at 25° C., c=0.2 g/dl) $\eta_{in}$=1.0 (dl/g), density 1.19 g/cc, and MFR (190° C.; 2.16 kg)=5.5 g/10 min.

The specimens of the examples were then filmed with the blow-film technique, on Formac Polyfilm 20, equipped with metering screw 20C13, L/D=25, RC=1.3; air gap 1 mm; 30-50 RPM; T=140-180° C.

The blow up ratio was 2.5 whereas the draw down ratio was 10. The films thus obtained had a thickness of approximately 30 μm. A week after filming, and after conditioning at 25° C., with 55% relative humidity, the tensile properties were measured according to the ASTM D882-88 standards.

Table 1 lists the thermal properties of the materials of the examples, whilst Table 2 gives the mechanical properties of the films.

TABLE 1

| | Thermal properties | | | | | |
|---|---|---|---|---|---|---|
| Example | Aromatic Content | $T_{m1}$ (° C.) | $\Delta H_{m1}$ (J/g) | $T_c$ (° C.) | $\Delta H_c$ (J/g) | $T_{m2}$ (° C.) |
| 1 | 54% | — | — | 42 | 24 | 130 |
| 2 | 60% | — | — | 101 | 21 | 149 |
| 3 (comp) | 50% | — | — | 38 | 20 | 121 |
| 4 | 54% | — | — | 53 | 25 | 132 |

TABLE 2

| | Mechanical properties | | | |
| --- | --- | --- | --- | --- |
| | EXAMPLE | | | |
| | 1 | 2 | 3(comp) | 4 |
| Tensile properties - longitudinal | | | | |
| Yield point (MPa) | 9 | 11.5 | 8 | 11.5 |
| Ultimate strength (MPa) | 33.5 | 39.5 | 26 | 47 |
| Elastic modulus (MPa) | 120 | 170 | 90 | 170 |
| Energy at break (MJ/m$^3$) | 169 | 144 | 143 | 158 |
| Elmendorf tear strength (N/mm) | | | | |
| (A) Longitudinal direction | 78 | 114 | 42 | 78 |
| B) Cross direction | 100 | 109 | 110 | 146 |
| (A + B)/2 | 89 | 111.5 | 76 | 114 |
| Anisotropic index A/B | 0.78 | 1.05 | 0.38 | 0.53 |

Disintegration TEST

For the materials of Example 1-4 the disintegration test was conducted in simulated composting conditions in a laboratory-scale test according to the Standard ISO 20200.

The tests were conducted on <150-200 micron compression molded films ground in liquid nitrogen until they were fragmented to sizes of less than 2 mm. After 90 days the material samples were completely disintegrated according to the Standard.

TABLE 3

| | DISINTEGRATION | | |
| --- | --- | --- | --- |
| Example | Aromatic content | Diacid/ Diol | Disintegration After 90 days |
| 1 | 54% | Azelaic Butandiol | complete |
| 2 | 60% | Azelaic Butandiol | complete |
| 3 | 50% | Azelaic Butandiol | Complete |
| 4 | 54% | Azelaic sebacic Butandiol | complete |

TABLE 4

| | DENSITY | | |
| --- | --- | --- | --- |
| Example | Aromatic content | Diacid/ Diol | Density |
| 1 | 54% | Azelaic Butandiol | 1.20 |
| 2 | 60% | Azelaic Butandiol | 1.21 |
| 3 | 50% | Azelaic Butandiol | 1.18 |
| 5 | 54% | Azelaic sebacic Butandiol | 1.19 |

The invention claimed is:

1. A biodegradable aliphatic/aromatic copolyester (AAPE) comprising:
    A) an acid component comprising repeating units of:
        1) 53 to 64 mol %, of an aromatic carboxylic acid;
        2) 47 to 36%, of an aliphatic acid at least 50% of which is azelaic acid;
    B) a diol component selected from the group consisting of $C_3$, $C_4$ and $C_6$ diols;
    said AAPE being disintegrated according to the Standard ISO 20200 in 90 days and having:
        a density of less than 1.22 g/cc
        a number average molecular weight $M_n$ of 40,000-140,000
        an inherent viscosity of 0.8-1.5
        a Elastic Modulus higher than 100 MPa
        a polydispersity index determined by means of GPC of between 1.8 and 25.

2. Biodegradable polyesters according to claim 1, wherein said acid component A) comprises repeating units of:
    1) 54 to 60 mol %, of an aromatic carboxylic acid;
    2) 46 to 40%, of an aliphatic acid at least 50% of which is azelaic acid.

3. Biodegradable polyesters according to claim 1, wherein the aromatic dicarboxylic acid is a compound of a phthalic acid.

4. Biodegradable polyesters according to claim 3, wherein the aromatic dicarboxylic acid is terephthalic acid.

5. Biodegradable polyesters according to claim 1, having a crystallization temperature higher than 40° C.

6. Biodegradable polyesters according to claim 1, wherein the dialcohol is 1,4-butanediol.

7. A film comprising the polyesters according to claim 1.

* * * * *